Patented Aug. 30, 1927.

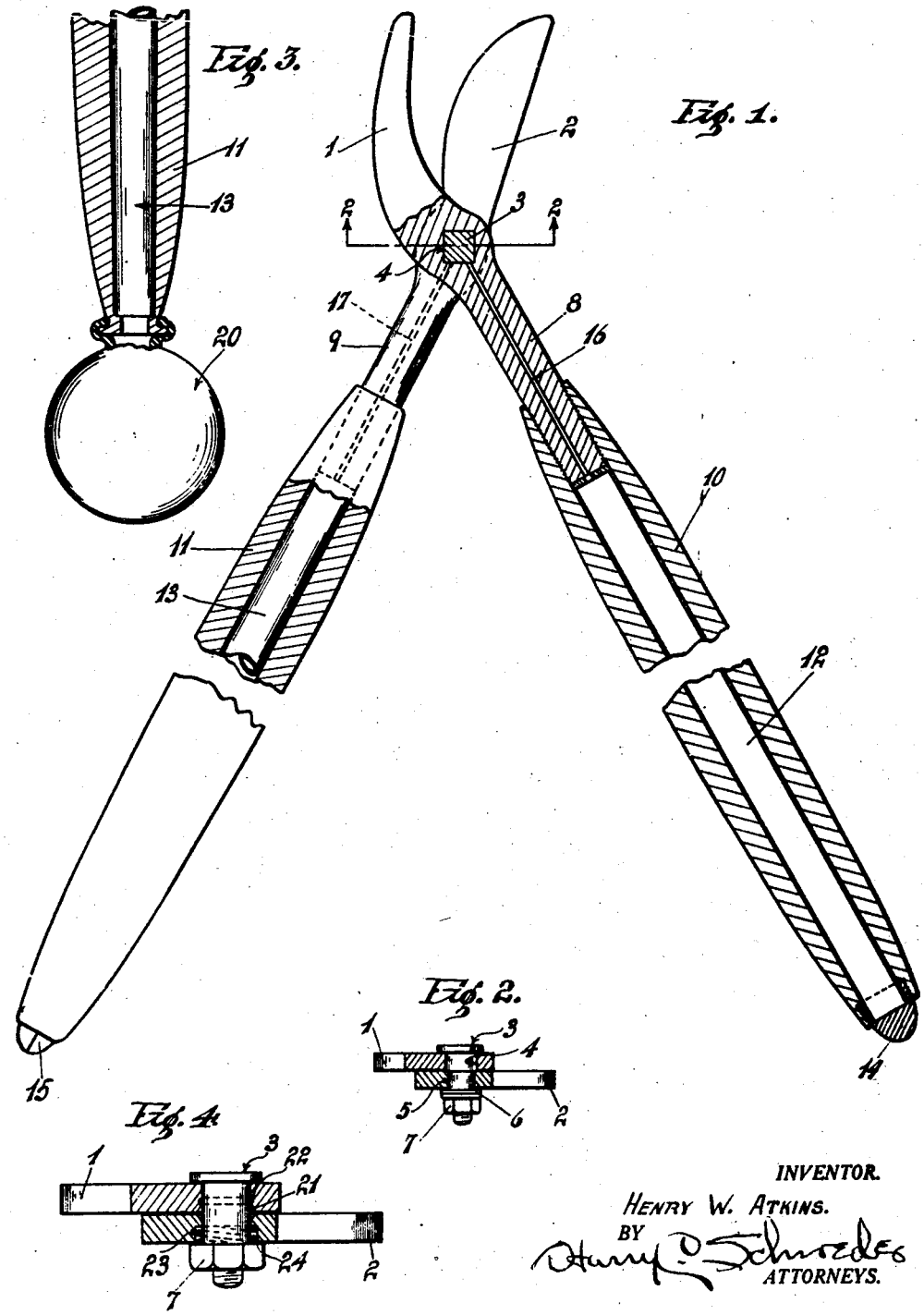

1,640,635

UNITED STATES PATENT OFFICE.

HENRY W. ATKINS, OF OAKLAND, CALIFORNIA.

PRUNING SHEARS.

Application filed October 27, 1924. Serial No. 746,120.

My invention is an improvement in pruning shears, the prime object of which is to provide means to distribute a disinfecting fluid over a pruning surface to prevent the spread of plant disease.

In the annexed drawing in which my invention is illustrated:

Figure 1 is a side elevation of my pruning shears with parts broken away to show the interior construction.

Figure 2 is a sectional view taken on the line 2—2 of Figure 1.

Figure 3 is a fragmentary sectional view of a modified form of handle.

Figure 4 is an enlarged sectional view taken on the line 2—2 of Figure 1 and showing a slightly modified form of pin.

Referring more particularly to the drawing, the usual form of hook 1 and knife 2 are pivoted together as at 3, the pivot consisting of a pin which extends through a square hole 4 in the hook 1, and is rounded as it passes through a round hole 5 in the knife 2. Spacing washers 6 are positioned around the pin 3 between the knife 2 and a nut 7 threaded on said pin. Shanks 8 and 9 extend from the hook 1 and knife 2 respectively, and are threaded into hollow handles 10 and 11, respectively.

Tubes 12 and 13 are positioned within the hollow handles 10 and 11 respectively, and are formed of a suitable non-metallic material which will not be attacked by the disinfecting substance. Suitable plugs 14 and 15 are threaded into the bottom of the handles 10 and 11 respectively, to enable said handles to be filled with the disinfecting substance. Ducts 16 and 17 are formed in the shanks 8 and 9, respectively, and extend from the tubes 12 and 13 to the openings 4 and 5, respectively, in the hook 1 and knife 2, respectively.

Thus, it will be seen that when the shears are hung downwardly the disinfecting substance will flow from the ducts 16 and 17 and openings 4 and 5 to spread over the hook 1 and a knife 2, the fit between the pin and the shears being sufficiently loose to allow of sufficient flow of the comparatively thin disinfectant to maintain the shears covered, whereby the spread of disease is prevented.

In the modified form shown in Figure 3, the handle 10 or 11 is provided with a flexible rubber bulb 20 secured to the end thereof and communicating with the hollow bore of the handle, the object being that if it is desired to force liquid into the shears, a slight pressure on this bulb will accomplish the purpose without holding the shears downwardly as previously described.

In the modified form shown in Figure 4, a means is provided whereby the liquid may more effectively flow over the cutting surfaces of the hook 1 and knife 2. This is accomplished by a notch 21 cut into the knife and hook in their adjoining surfaces and around the pin 3, and a recess 22 in the hook 1, joining with the duct 16, which recess extends around the pin 3. The notch 21 and the recess 22 are cut into the material in such close proximity that the liquid disinfectant may run from one into the other and from the notch out over said cutting surfaces thus effectively distributing the disinfectant over the latter. The hook 2 is countersunk as at 23 and a spring 24 is positioned therein which bears against the nut 7, thus pressing the knife against the hook at all times.

Referring back to Figs. 1 and 2, the pin 3 acts as a loose plug, but it does not completely shut off the flow of liquid through the ducts 16 and 17. The idea here is to inject the liquid around the immediate surfaces by forcing the liquid into the shears. A slight pressure of the bulb will accomplish the purpose, since these are all loose fitting joints. These pins soon become worn in the rough usage of pruning off dead trees. It is best to make them tight in the beginning, because in the hard usage, they become loose soon enough and thereby permit the liquid to flow out freely.

Having described my invention, I claim:

1. Pruning shears comprising a hook and a knife, a pin extending through said hook and knife to pivot them together, shanks extending from said hook and said knife, hollow handles secured to said shanks, said shanks having ducts formed therein, extending from said hollow handles to said pivot pin.

2. Pruning shears comprising a hook and a knife, a pin extending through said hook and knife to pivot them together, shanks extending from said hook and said knife, hollow handles secured to said shanks, said shanks having ducts formed therein, extending from said hollow handles to said pivoting pin, tubes positioned in said hollow handles, and plugs threaded into the bottom of said hollow handles.

3. Pruning shears comprising a pair of members pivoted together by means of a pin, one of said members comprising a knife, a shank and a hollow handle containing a tube, said shank being provided with an internal duct extending from said tube to said pin, each of said pivoted members being provided with an annular recess adjacent said pin and connected with said duct, and means connecting said recesses with the surface of said knife.

4. A clipping tool comprising a pair of members pivoted together by means of a pin, one of said members being provided with a cutting element and a hollow handle, means for retaining a liquid in said hollow handle, one of said members being provided with an annular recess adjacent said pin, means for conducting liquid from said hollow handle to said recess, and means for conducting said liquid from said recess to said cutting element.

In testimony whereof I affix my signature.

HENRY W. ATKINS.